US011176924B2

(12) United States Patent
Trim et al.

(10) Patent No.: US 11,176,924 B2
(45) Date of Patent: Nov. 16, 2021

(54) REDUCED MISS RATE IN SOUND TO TEXT CONVERSION USING BANACH SPACES

(71) Applicant: INTERNATIONAL BUSINESS MACHINES CORPORATION, Armonk, NY (US)

(72) Inventors: Craig M. Trim, Ventura, CA (US); Aaron K. Baughman, Cary, NC (US); Micah Forster, Round Rock, TX (US); Shikhar Kwatra, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 150 days.

(21) Appl. No.: 16/738,370

(22) Filed: Jan. 9, 2020

(65) Prior Publication Data
US 2021/0217421 A1    Jul. 15, 2021

(51) Int. Cl.
| | | |
|---|---|---|
| *G10L 15/06* | (2013.01) | |
| *G10L 15/22* | (2006.01) | |
| *G10L 15/02* | (2006.01) | |
| *G10L 25/24* | (2013.01) | |
| *G10L 15/30* | (2013.01) | |
| *G10L 25/51* | (2013.01) | |
| *G10L 15/26* | (2006.01) | |

(52) U.S. Cl.
CPC .............. *G10L 15/06* (2013.01); *G10L 15/02* (2013.01); *G10L 15/22* (2013.01); *G10L 15/26* (2013.01); *G10L 15/30* (2013.01); *G10L 25/24* (2013.01); *G10L 25/51* (2013.01)

(58) Field of Classification Search
CPC ........................ G10L 15/06; G10L 2015/06
See application file for complete search history.

(56) References Cited

U.S. PATENT DOCUMENTS

| | | |
|---|---|---|
| 7,590,589 B2 | 9/2009 | Hoffberg |
| 8,755,837 B2 | 6/2014 | Rhoads et al. |
| (Continued) | | |

FOREIGN PATENT DOCUMENTS

FR     2871262 B1    12/2005

OTHER PUBLICATIONS

Mell et al., "The NIST Definition of Cloud Computing", NIST, Special Publication 800-145, Sep. 2011, 7 pages.
(Continued)

*Primary Examiner* — Douglas Godbold
(74) *Attorney, Agent, or Firm* — Brian Restauro; Andrew D. Wright; Roberts Calderon Safran & Cole, P.C.

(57) ABSTRACT

A computer-implemented method includes: comparing features extracted from a first document that include a sound to features extracted from acoustic files related to the sound; designating the sound in a document of the plurality of documents as a true; designating the sound in the first document as a false negative; generating a first sound vector for the sound in the first document in response to the sound in the first document being designated a false negative; generating a sound vector for each of the documents designated as a true positive; creating a centroid vector for the sound vectors of the documents designated as a true positive; and redesignating the sound in the first document from a false negative to a true positive in response to the first sound vector and the centroid vector being a Banach space.

20 Claims, 6 Drawing Sheets

(56) References Cited

U.S. PATENT DOCUMENTS

| | | | |
|---|---|---|---|
| 9,368,110 B1* | 6/2016 | Hershey | G10L 25/51 |
| 9,886,670 B2 | 2/2018 | Dirac et al. | |
| 10,042,993 B2 | 8/2018 | Beigi | |
| 10,102,476 B2 | 10/2018 | Caraviello et al. | |
| 2004/0181408 A1* | 9/2004 | Acero | G10L 15/144 |
| | | | 704/255 |
| 2007/0118376 A1* | 5/2007 | Mukerjee | G10L 15/063 |
| | | | 704/245 |
| 2012/0158399 A1* | 6/2012 | Tremblay | G10L 15/063 |
| | | | 704/9 |
| 2013/0214971 A1 | 8/2013 | Robinson | |
| 2019/0287519 A1* | 9/2019 | Ediz | G06F 40/30 |
| 2020/0168226 A1* | 5/2020 | Ganti | G06F 3/167 |

OTHER PUBLICATIONS

Model, "Multiprocessing via intercommunicating LISP systems", ACMDIGITALLIBRARY, Aug. 1980, 5 pages.

Model et al., "A general framework for extension of a tracking range of user-calibration-free remote eye-gaze tracking systems", ACMDIGITALLIBRARY, Mar. 2012, 4 pages.

Model et al. "A probabilistic approach for the estimation of angle kappa in infants", ACMDIGITALLIBRARY, Mar. 2012, 4 pages.

Saxena, "Precision vs. Recall", TowardsDataScience, May 11, 2018, 7 pages.

* cited by examiner

REDUCED MISS RATE IN SOUND TO TEXT CONVERSION USING BANACH SPACES

BACKGROUND

Aspects of the present invention relate generally to sound identification and, more particularly, to reducing the miss rate of identifying a sound for the purpose of improving the accuracy of an acoustic model.

In sound to text conversion for applications such as, for example, closed captioning, sound input is analyzed and matched to known sounds in a database to attempt to identify the sound and produce the appropriate text to represent the sound. In closed captioning, for example, the sounds can be predominantly speech.

SUMMARY

In a first aspect of the invention, there is a computer-implemented method including: comparing, by a computer device, features extracted from a first document of a plurality of documents that include a sound, to features extracted from acoustic files related to the sound; designating, by the computer device, the sound in a document of the plurality of documents as a true positive in response to correctly identifying the sound; designating, by the computer device, the sound in the first document as a false negative in response to failing to identify the sound, and the sound existing in an acoustic library; generating, by the computer device, a first sound vector for the sound in the first document in response to the sound in the first document being designated a false negative; generating, by the computer device, a sound vector for each of the documents designated as a true positive; creating, by the computer device, a centroid vector for the sound vectors of the documents designated as a true positive; and redesignating, by the computer device, the sound in the first document from a false negative to a true positive in response to the first sound vector and the centroid vector being a Banach space.

In another aspect of the invention, there is computer program product comprising one or more computer readable storage media having program instructions collectively stored on the one or more computer readable storage media. The program instructions are executable to: compare features extracted from a first document of a plurality of documents that include a sound, to features extracted from acoustic files related to the sound; designate the sound in a document of the plurality of documents as a true positive in response to correctly identifying the sound; designate the sound in the first document as a false negative in response to failing to identify the sound, and the sound existing in an acoustic library; generate a first sound vector for the sound in the first document in response to the sound in the first document being designated a false negative; generate a sound vector for each of the documents designated as a true positive; create a centroid vector for the sound vectors of the documents designated as a true positive; and redesignate the sound in the first document from a false negative to a true positive in response to the first sound vector and the centroid vector being a Banach space.

In another aspect of the invention, there is system including a processor, a computer readable memory, and one or more computer readable storage media. The system includes: program instructions to compare features extracted from a first document of a plurality of documents that include a sound, to features extracted from acoustic files related to the sound; program instructions to designate the sound in a document of the plurality of documents as a true positive in response to correctly identifying the sound; program instructions to designate the sound in the first document as a false negative in response to failing to identify the sound, and the sound existing in an acoustic library; program instructions to generate a first sound vector for the sound in the first document in response to the sound in the first document being designated a false negative; program instructions to generate a sound vector for each of the documents designated as a true positive; program instructions to create a centroid vector for the sound vectors of the documents designated as a true positive; and program instructions to redesignate the sound in the first document from a false negative to a true positive in response to the first sound vector and the centroid vector being a Banach space. The program instructions are stored on the one or more computer readable storage media for execution by the processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
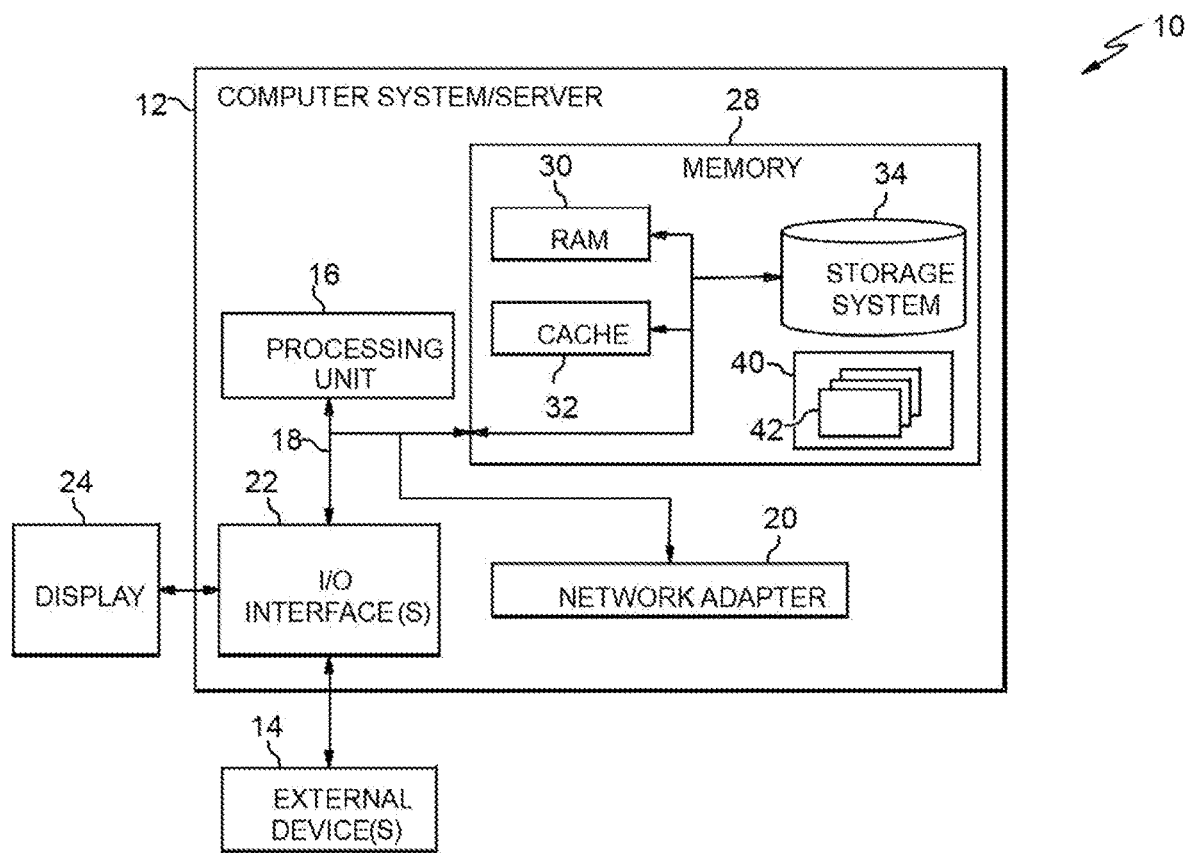
FIG. 1 depicts a cloud computing node according to an embodiment of the present invention.

Aspects of the present invention relate generally to sound identification and, more particularly, to reducing the miss rate of identifying a sound for the purpose of improving the accuracy of an acoustic model. According to aspects of the invention, a sound input including a sound is analyzed to determine a text label that accurately represents the sound in a closed caption. In embodiments, features of the sound are extracted in portions of the sound input that contains the sound and compared to the same features in known sound acoustic files in an acoustic library. In this manner, implementations of the invention add acoustic files that represent the sound to the acoustic library. These added files result in a more accurate correlation of a text label to future recognitions of the sound.

Implementations of the invention are improvements to the functioning of a computer. For example, converting false negative designations of a sound to true positive designations improves the accuracy and efficiency of a computer when corelating a text label to a sound. In addition, implementations of the invention include features that are not well understood, routine, or conventional activity in the relevant art. For example, generating a first sound vector for a document designated as a false negative, creating a centroid vector for sound vectors of documents designated as true positives, and redesignating the sound in the first document from a false negative to a true positive in response to the first sound vector and the centroid vector being a Banach space, is not well-understood, routine, or conventional.

The problem of domain adapting a closed captioning solution generally optimizes the word error rate by adding to a language model and altering an acoustic model. However, the majority of available content is missed (a low recall) since the miss rate of content is not optimized. Embodiments of the invention use mathematical spatial operations to determine if a set of content or content elements should be included in the true positive class (explained in detail below). When the content is included, the miss rate is optimized. Embodiments use the inverse of the data set to adapt the language and acoustic models.

In sound recognition, as with other data identification, a balance is drawn between recall and precision. For example, in closed captioning, recall is a measure of how many of the sounds were correctly identified and converted to text labels, whereas precision is a measure of how many of the identified sounds were correctly identified. One hundred percent recall means that every sound was correctly identified, but to achieve that there may have also been incorrect identifications of some of the sounds (each sound may be identified with multiple text labels). One hundred percent precision means that no sound was incorrectly identified. As a result, systems that put an emphasis on precision will generally reduce recall, and vice versa. The miss rate in sound recognition is the percentage of sounds (either correctly or incorrectly) not identified. Embodiments improve sound recognition by reducing the miss rate. Embodiments of the invention are configured to: optimize precision with Banach space vectors; encode document and acoustic sound into Banach spaces; set Banach space limits that correlate with a desired precision level; and optimize word and acoustic correlation in accordance with a miss rate.

Embodiments of the invention include methods that optimize Banach space vectors, and set a Banach space limit that is correlated with a desired precision level. Embodiments include encoding document and acoustic sound into a Banach space. Embodiments include optimizing word correlation to acoustics based on a miss rate.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
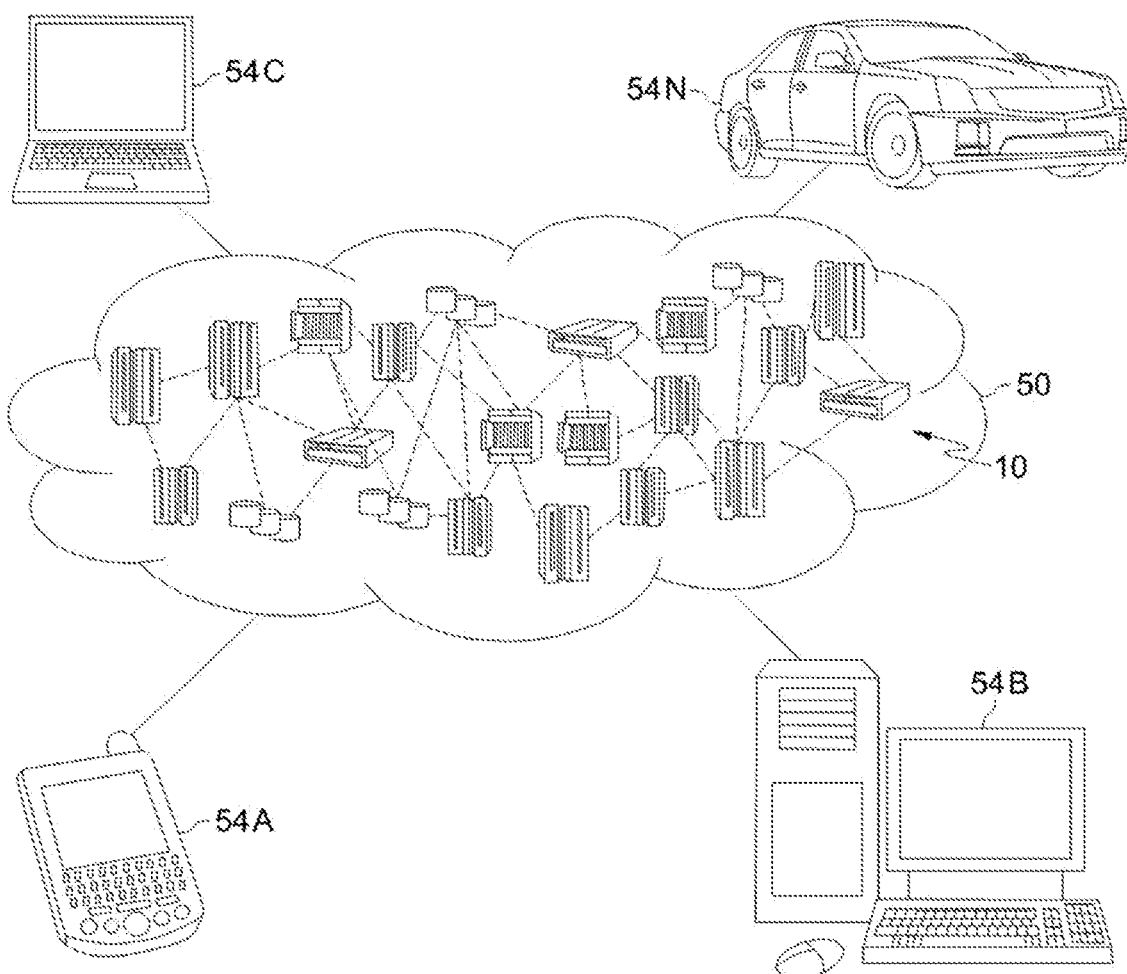
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
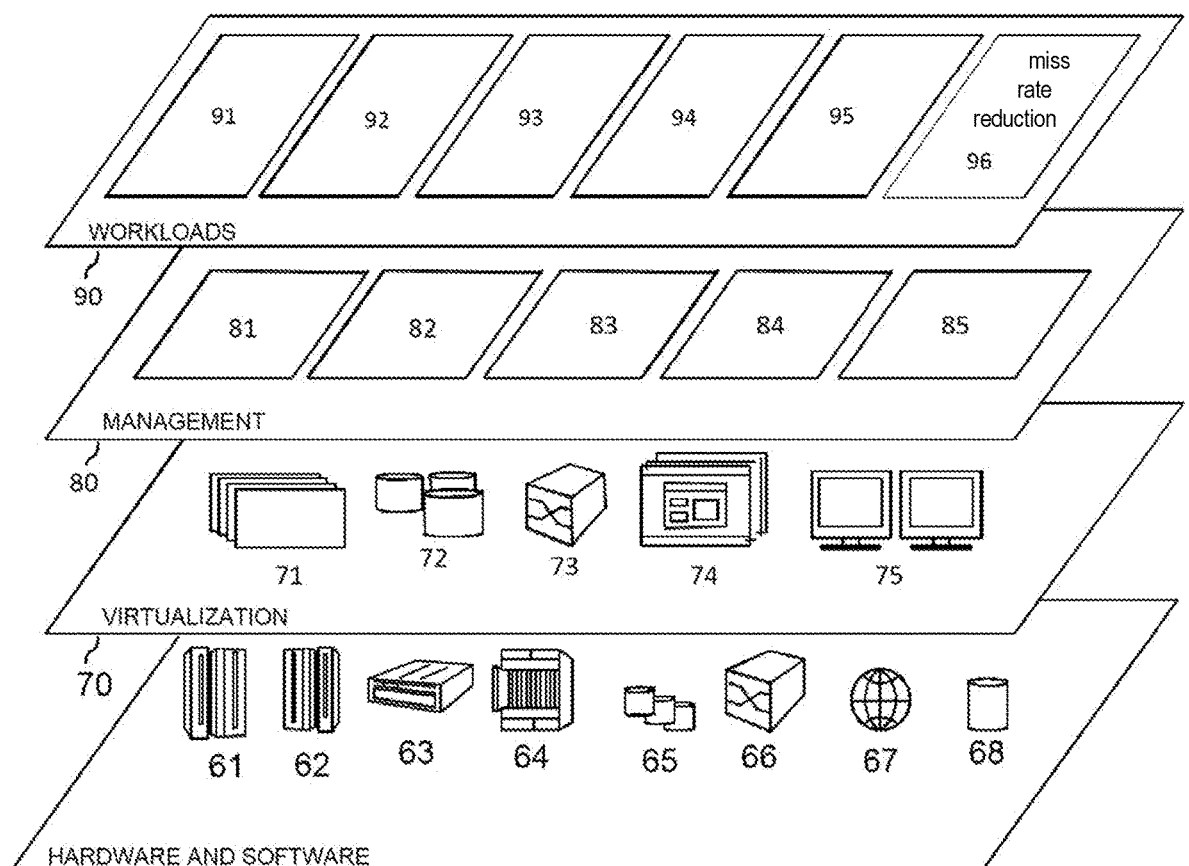
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and miss rate reduction 96.

Implementations of the invention may include a computer system/server 12 of FIG. 1 in which one or more of the program modules 42 are configured to perform (or cause the computer system/server 12 to perform) one or more functions of the miss rate reduction 96 of FIG. 3. For example, the one or more of the program modules 42 may be configured to: compare features extracted from a first document of a plurality of documents that include a sound, to features extracted from acoustic files related to the sound; designate the sound in a document of the plurality of documents as a true positive in response to correctly identifying the sound; designate the sound in the first document as a false negative in response to failing to identify the sound, and the sound existing in an acoustic library; generate a first sound vector for the sound in the first document in response to the sound in the first document being designated a false negative; generate a sound vector for each of the documents designated as a true positive; create a centroid vector for the sound vectors of the documents designated as a true positive; and redesignate the sound in the first document from a false negative to a true positive in response to the first sound vector and the centroid vector being a Banach space.

To the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Figure 4:
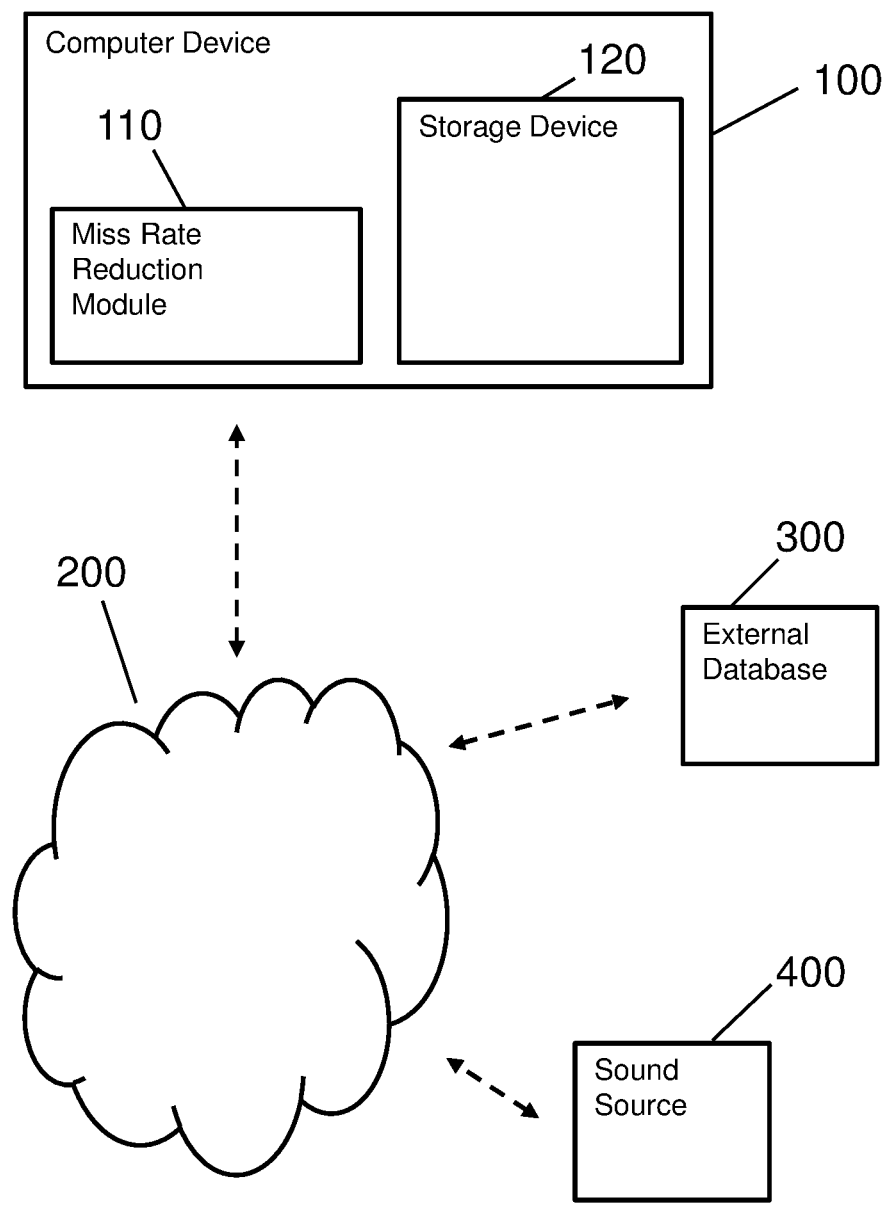
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks 200 such as, for example, cloud computing environment 50. In this example, computer device 100 includes a miss rate reduction module 110, for example, one or more of program modules 42 in FIG. 1, and a storage device 120 such as, for example, storage system 34 in FIG. 1.

FIG. 4 shows an external database 300 such as, for example, another computer device having some or all of the features of computer system/server 12 in FIG. 1, that is external to computer device 100 and contains an acoustic library that is accessed by miss rate reduction module 110 (other examples include more than one external database 300). In embodiments, one or more other databases that are accessed by miss rate reduction module 110 are stored on storage device 120.

FIG. 4 shows a sound source 400 such as, for example, another computer device having some or all of the features of computer system/server 12 in FIG. 1, that provides sound input to miss rate reduction module 110 to be analyzed by miss rate reduction module 110 in order to produce a text representation of the one or more sounds in the sound input. In embodiments, sound source 400 is a digital recording and/or transmitting device including a microphone.

Figure 5:
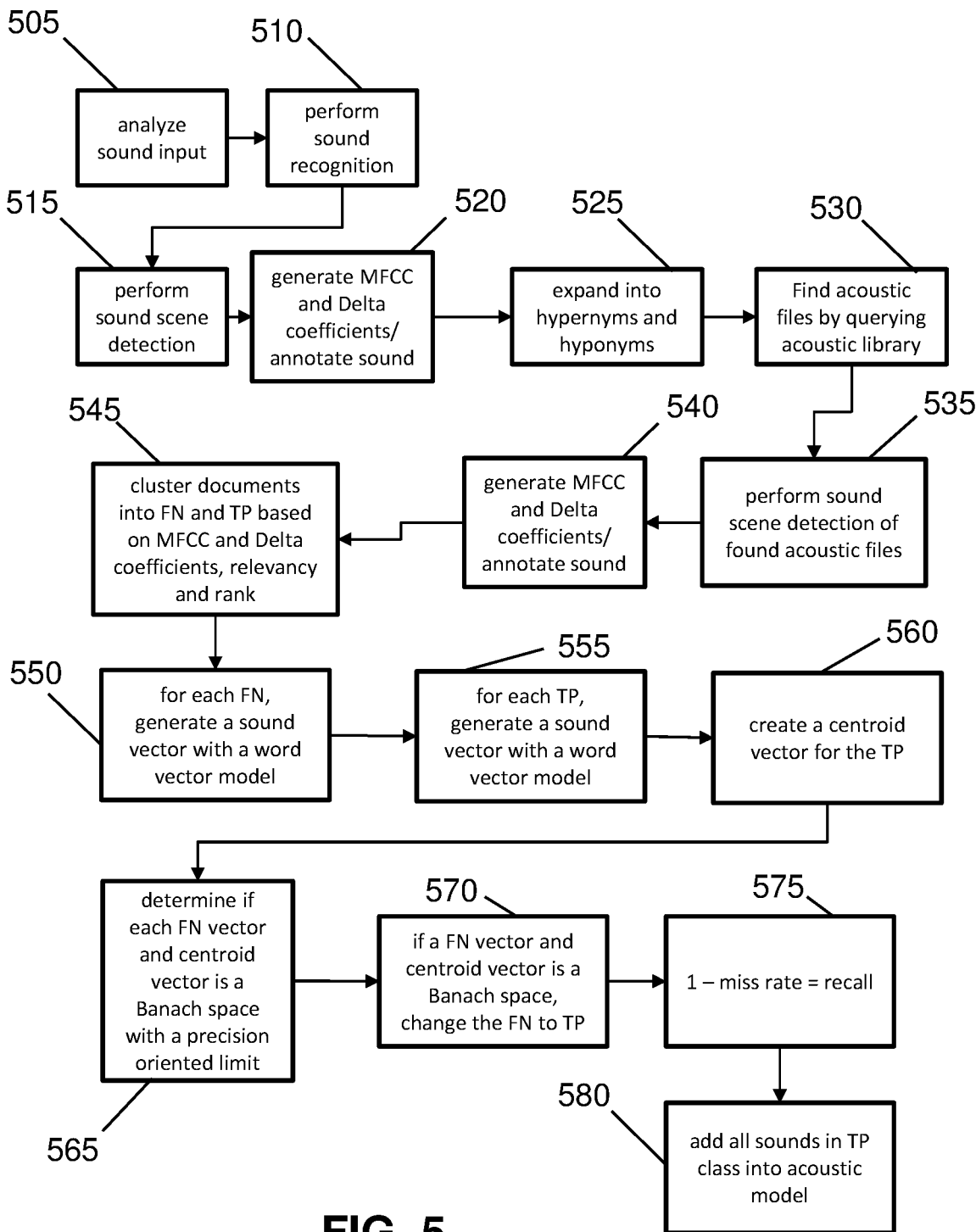
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 505, the system analyzes sound input. In embodiments, miss rate reduction module 110 analyzes sound input from sound source 400 that miss rate reduction module 110 receives over network 200. In embodiments, the sound input is an audio file containing a duration of audio information. The audio file contains a particular sound that miss rate reduction module 110 is attempting to correctly identify with a text label. In embodiments, miss rate reduction module 110 defines a plurality of documents in the audio information. Each document is a subset of the duration of the audio information in the sound input. In embodiments, two or more of the documents overlap in that they contain some of the same audio information. In embodiments, all of the documents include the particular sound (hereinafter referred to as "the sound"). In embodiments, the sound is, for example, a ball bouncing, crowd applause, a foot contacting the ground, etc.

At step 510, the system performs sound recognition on the sound. In embodiments, miss rate reduction module 110 performs sound recognition on a portion of the audio file that is the sound itself to identify the sound as, for example, a ball bouncing or a foot contacting the ground. In embodiments, miss rate reduction module 110 performs the sound recognition in step 510 by applying a sound recognition algorithm such as, for example, preliminary data processing, feature extraction, and classification. In embodiments, miss rate reduction module 110 performs sound recognition on the sound by itself in an attempt to identify the sound and assign a text label to the sound that is used in, for example, closed captioning.

At step 515, the system performs sound scene detection. In embodiments, miss rate reduction module 110 performs sound scene detection on accumulations of additional sounds around the sound ("documents") to help identify the sound by identifying the additional sounds. In embodiments, miss rate reduction module 110 performs the sound scene detection by taking segments of the sound input with a start time of a number of particular durations before the sound and lasting for a given duration. The segments each contain the sound.

In embodiments, miss rate reduction module 110 initially assigns a text label to the sound itself (in step 510) and to the sound in each of the documents (in step 515) in response to miss rate reduction module 110 identifying the sound. If miss rate reduction module 110 does not identify the sound, then no text label is applied to the sound and, for example, the closed captioning includes a blank or some other indication that the sound is not identified. In embodiments, miss rate reduction module 110 identifies the sound in some documents, but not others. In addition, in embodiments, miss rate reduction module 110 may or may not identify the sound by itself.

At step 520, the system generates Mel Frequency Cepstral Coefficients (MFCC) and Delta coefficients and annotates the sound. In embodiments, miss rate reduction module 110 extracts features (MFCC and Delta coefficients) from the sound itself and the documents, and annotates the sound itself and the sound in the documents. These annotations further define the sound for use in step 545.

At step 525, the system expands the sound into hypernyms and hyponyms. In embodiments, miss rate reduction module 110 obtains hypernyms and hyponyms from a database on storage device 120 and/or from external database 300. A hypernym is a word with a broad meaning that more specific words fall under (a superordinate). For example, "color" is a hypernym of "red". A hyponym is a word of more specific meaning than a general or superordinate term applicable to it. For example, "red" is a hyponym of "color". In embodiments, as a result of miss rate reduction module 110 identifying the sound as "a ball bouncing", miss rate reduction module 110 obtains hypernym "contact" (text label). In embodiments, as a result of miss rate reduction module 110 identifying the sound as "a ball bouncing", miss rate reduction module 110 obtains hyponym "a basketball bouncing" (text label).

At step 530, the system finds acoustic files by querying an acoustic library. In embodiments, miss rate reduction module 110 queries an acoustic library on storage device 120 and/or external database 300 for acoustic files that have the same text label as the sound (from step 510), the same text labels as the sound in the documents (from step 515), and that same text labels of the hyponyms and hypernyms (from step 525).

At step 535, the system performs sound scene detection on the acoustic files found at step 530. In embodiments, miss rate reduction module 110 performs the sound scene detection of step 515 on the acoustic files found in step 530 to help identify the sound by identifying additional sounds around the sound in the found acoustic files.

At step 540, the system generates MFCC and Delta coefficients for the found acoustic files and annotates the sound in each of the found acoustic files. In embodiments, miss rate reduction module 110 extracts features (MFCC and Delta coefficients) from the found acoustic files, and annotates the sound in the found acoustic files. These annotations further define the sound for use in step 545.

At step 545, the system clusters the documents (from step 515) and the sound itself (from step 510) into false negative and true positive based on MFCC and Delta coefficients, relevancy and rank. In embodiments, the relevancy is a measure of how much of the document is related to the sound (based on, for example, how many of the other sounds in the document are related to the sound), and miss rate reduction module 110 ranks the documents based on, for example, the MFCC, Delta coefficients, and relevancy. In embodiments, miss rate reduction module 110 classifies the sound in each of the documents and the sound itself as one of a true positive, a true negative, a false positive, or a false negative, and clusters them accordingly. A true positive classification means that the system initially identified the sound as, for example, a ball bouncing on the ground, and the sound is a ball bouncing on the ground. A true negative classification means that the system initially was not able to identify the sound and was correct in not identifying the sound because the sound does not exist in the system's database. A false positive classification means that the system initially identified the sound as, for example, a foot contacting the ground, but the identification was incorrect because the sound is, for example, a ball bouncing on the ground. A false negative classification means that the system initially was not able to identify the sound, but the system should have identified the sound because the sound exists in the system's database. In embodiments, miss rate reduction module 110 classifies the sound in each of the documents and the sound itself as one of a true positive, a true negative, a false positive, or a false negative by comparing the results of steps 540 and 520. In embodiments, miss rate reduction module 110 considers an identification of the sound in step 520 to be a correct identification of the sound if the identification matches an identification of the sound in step 540.

At step 550, for each false negative, the system generates a sound vector with a word vector model. In embodiments, miss rate reduction module 110, for each non-identification of the false negative class (the false negatives), the system generates a sound vector that represents the particular sound, including annotations from steps 520 and 540.

At step 555, for each true positive, the system generates a sound vector with a word vector model. In embodiments, miss rate reduction module 110, for each correct identification of the sound (the true positives), the system generates a sound vector that represents the particular sound, including annotations from steps 520 and 540.

At step 560, the system creates a centroid vector for the true positives. In embodiments, miss rate reduction module 110 generates a centroid vector for true positives. The centroid vector is a mean (average) of sound vectors of all of the true positives.

At step 565, the system determines if each false negative vector and the centroid vector is a Banach space with a precision-oriented limit. In embodiments, miss rate reduction module 110 determines, for each false negative, if the sound vector of the false negative and the centroid vector is a Banach space with a precision-oriented limit.

A Banach space is a normed vector space that always converges at a well-defined limit. For example, a Banach space is a vector space with a metric that allows the computation of vector length and distance between vectors and is complete in the sense that a Cauchy sequence of vectors always converges to a well-defined limit that is within the space. In embodiments, a user of the system sets the precision limits of the Banach space (through miss rate reduction module 110) to achieve the desired reduction in the miss rate (and, therefore increase recall) while also maintaining precision within a set range or level.

The following formulas define miss rate, recall, and precision:

Miss Rate=False Negative/(False Negative+True Positive)=1−Recall

Recall=True Positive/(True Positive+False Negative)

Precision=True Positive/(True Positive+False Positive)

As a closed captioning system is domain adapted, the probability of obtaining words given certain acoustic signals should increase:

$P(words|acoustics)=P(words)P(acoustics|words)/P(acoustics)$

In embodiments, the content that is selected to be inserted into the language model, P(words), and the acoustic model, P(acoustics|words) is a compromise between recall and precision. In this way, enough relevant content is used to adapt the closed caption. In embodiments, the system minimizes the miss rate by using Banach spaces. A user selects how strict the Banach properties, such as the convergence of acoustic and word representations between classes, are to determine if a document should be added to the false positive or true negative space/class. From a geometric perspective, the recall of the system will be very high and offset by a Banach measure that latently increases precision.

At step 570, the system changes a particular false negative to a true positive if the sound vector of that false negative and the centroid vector is a Banach space with the precision-oriented limit. In embodiments, miss rate reduction module 110 changes a particular false negative to a true positive in response to the sound vector of that false negative vector and the centroid vector is a Banach space with the precision-oriented limit. In embodiments, the false negative that is changed to a true positive is then added to the true positive class.

At step 575, the system recalculates the recall as one minus the miss rate. In embodiments, miss rate reduction module 110 recalculates the recall based on a recalculated miss rate that includes the false negatives that are changed to true positives in step 570. As a result of miss rate reduction module 110 changing some of the false negatives to true positives, and thereby reducing the miss rate, the recall increases.

At step 580, the system adds all sound in the true positive class into an acoustic model. In embodiments, miss rate reduction module 110 adds all of the true positives into an acoustic model as representations of the sound. The acoustic model is used in future attempts to recognize the sound.

The flowchart shown in FIG. 5 is directed to processing sound input. The same steps as shown in FIG. 5 can similarly be applied, in embodiments, to video input to change some false negative object recognition cases into true positive object recognition cases. In cases of video input, in embodiments, miss rate reduction module 110 identifies an object in the video (as opposed to a sound in a sound input) input with a text label. In cases of video input, in embodiments, miss rate reduction module 110 queries news and/or video archives to find video files that that have the same labels as the object, and the same labels as the hyponyms and hypernyms of the object. In cases of video input, in embodiments, miss rate reduction module 110 clusters the documents and the object itself into false negative and true positive based on term frequency-inverse document frequency (TF-IDF), relevancy and rank. In information retrieval, TF-IDF is a numerical statistic that is intended to reflect how important a word is to a document in a collection or corpus. TF-IDF is used as a weighting factor in searches of information retrieval, text mining, and user modeling. The TF-IDF value increases proportionally to the number of times a word (or in this case, a video image) appears in the document and is offset by the number of documents in the corpus that contain the word (or in this case, the video image), which helps to adjust for the fact that some words (or in this case, video images) appear more frequently in general.

Figure 6:
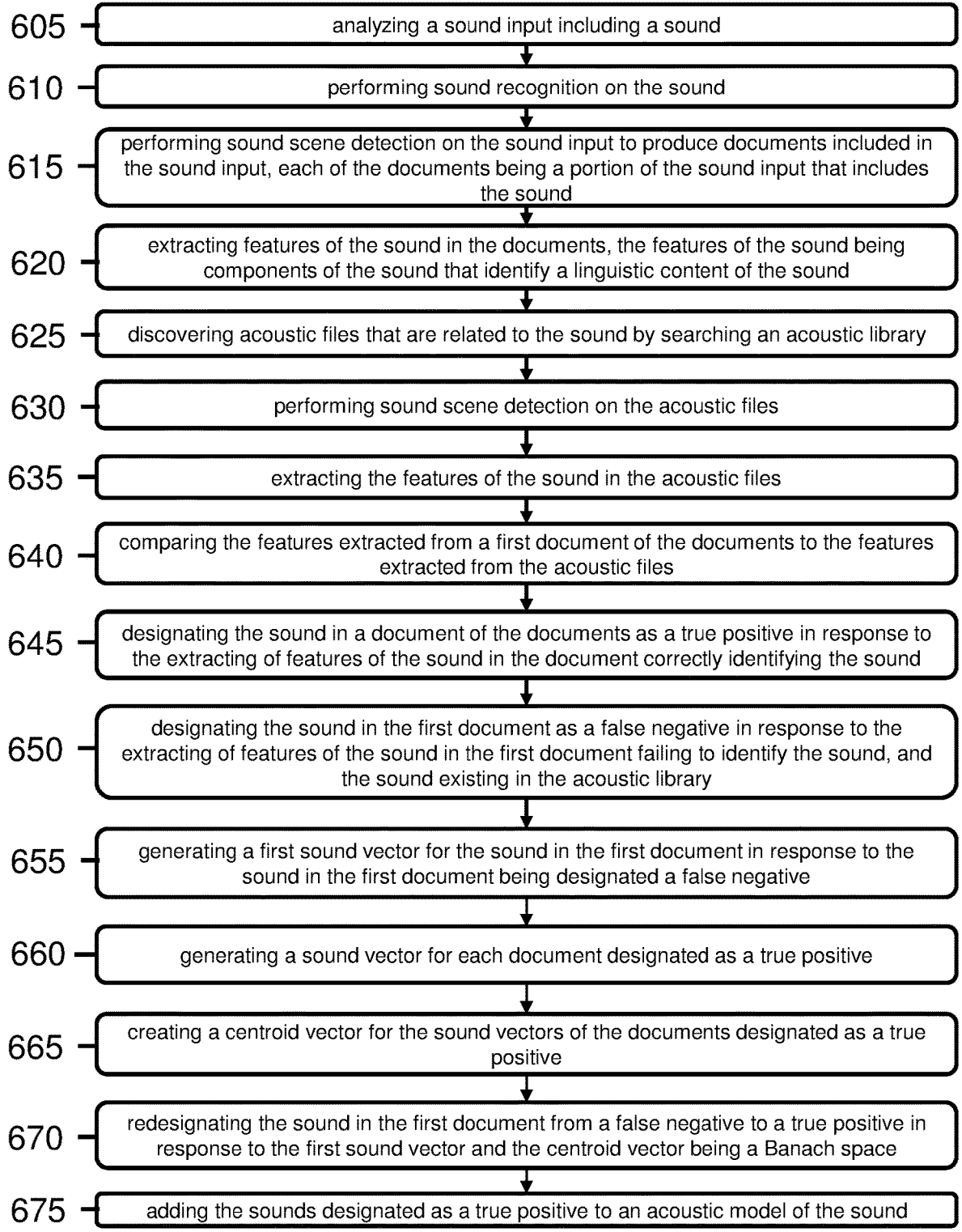
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 4 and are described with reference to elements depicted in FIG. 4 and described in FIG. 5.

At step 605, the system analyzes sound input including a sound. In embodiments, miss rate reduction module 110 analyzes sound input from sound source 400 that miss rate reduction module 110 receives over network 200.

At step 610, the system performs sound recognition on the sound. In embodiments, miss rate reduction module 110 performs sound recognition on the sound.

At step 615, the system performs sound scene detection on the sound input to produce documents included in the sound input, each of the documents being a portion of the sound input that includes the sound. In embodiments, miss rate reduction module 110 performs sound scene detection on the sound input from sound source 400 to produce documents included in the sound input from sound source 400, each of the documents being a portion of the sound input from sound source 400 that includes the sound.

At step 620, the system extracts features of the sound in the documents, the features of the sound being components of the sound that identify a linguistic content of the sound. In embodiments, miss rate reduction module 110 extracts features of the sound in the documents, the features of the sound being components of the sound that identify a linguistic content of the sound.

At step 625, the system discovers acoustic files that are related to the sound by searching an acoustic library. In embodiments, miss rate reduction module 110 discovers acoustic files that are related to the sound by searching an acoustic library on external database 300.

At step 630, the system performs sound scene detection on the acoustic files. In embodiments, miss rate reduction module 110 performs sound scene detection on the acoustic files discovered in the acoustic library on external database 300.

At step 635, the system extracts the features of the sound in the acoustic files. In embodiments, miss rate reduction module 110 extracts the features of the sound in the acoustic files discovered in the acoustic library on external database 300.

At step 640, the system compares the features extracted from a first document of the documents to the features extracted from the acoustic files. In embodiments, miss rate reduction module 110 compares the features extracted from a first document of the documents to the features extracted from the acoustic files discovered in the acoustic library on external database 300.

At step 645, the system designates the sound in a document of the documents as a true positive in response to the extracting of features of the sound in the document correctly identifying the sound. In embodiments, miss rate reduction module 110 designates the sound in a document of the documents as a true positive in response to the extracting of features of the sound in the document correctly identifying the sound.

At step 650, the system designates the sound in the first document as a false negative in response to the extracting of features of the sound in the first document failing to identify the sound, and the sound existing in the acoustic library. In embodiments, miss rate reduction module 110 designates the sound in the first document as a false negative in response to the extracting of features of the sound in the first document failing to identify the sound, and the sound existing in the acoustic library on external database 300.

At step 655, the system generates a first sound vector for the sound in the first document in response to the sound in the first document being designated a false negative. In embodiments, miss rate reduction module 110 generates a first sound vector for the sound in the first document in response to the sound in the first document being designated a false negative.

At step 660, the system generates a sound vector for each document designated as a true positive. In embodiments, miss rate reduction module 110 generates a sound vector for each document designated as a true positive.

At step 665, the system creates a centroid vector for the sound vectors of the documents designated as a true positive. In embodiments, miss rate reduction module 110 creates a centroid vector for the sound vectors of the documents designated as a true positive.

At step 670, the system redesignates the sound in the first document from a false negative to a true positive in response to the first sound vector and the centroid vector being a Banach space. In embodiments, miss rate reduction module 110 redesignates the sound in the first document from a false negative to a true positive in response to the first sound vector and the centroid vector being a Banach space.

At step 675, the system adds the sounds designated as a true positive to an acoustic model of the sound. In embodiments, miss rate reduction module 110 adds the sounds designated as a true positive to an acoustic model of the sound.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
comparing, by a computer device, features extracted from a first document of a plurality of documents that include a sound, to features extracted from acoustic files related to the sound;
designating, by the computer device, the sound in a document of the plurality of documents as a true positive in response to correctly identifying the sound;
designating, by the computer device, the sound in the first document as a false negative in response to failing to identify the sound, and the sound existing in an acoustic library;
generating, by the computer device, a first sound vector for the sound in the first document in response to the sound in the first document being designated a false negative;
generating, by the computer device, a sound vector for each of the documents designated as a true positive;
creating, by the computer device, a centroid vector for the sound vectors of the documents designated as a true positive; and
redesignating, by the computer device, the sound in the first document from a false negative to a true positive in response to the first sound vector and the centroid vector being a Banach space.

2. The computer-implemented method of claim 1, further comprising:
analyzing, by the computer device, a sound input including the sound;
performing, by the computer device, sound recognition on the sound;
performing, by the computer device, sound scene detection on the sound input to produce the plurality of documents, each of the plurality of documents being a portion of the sound input that includes the sound;
extracting, by the computer device, the features of the sound in the plurality of documents, the features of the sound being components of the sound that identify a linguistic content of the sound;
discovering, by the computer device, the acoustic files by searching the acoustic library;
performing, by the computer device, sound scene detection on the acoustic files;
extracting, by the computer device, the features of the sound in the acoustic files; and
adding, by the computer device, the sounds designated as a true positive to an acoustic model of the sound.

3. The computer-implemented method of claim 2, wherein the discovering further comprises discovering acoustic files that are related to at least one selected from the group consisting of: a hypernym of the sound, and a hyponym of the sound.

4. The computer-implemented method of claim 2, wherein each of the documents is a different portion of the sound input.

5. The computer-implemented method of claim 2, wherein each document is a logical containment of data.

6. The computer-implemented method of claim 2, wherein the first sound vector includes the features of the sound in the first document.

7. The computer-implemented method of claim 6, wherein the features of the sound in the first document include Mel Frequency Cepstral Coefficients and Delta coefficients.

8. The computer-implemented method of claim 2, wherein the Banach space comprises a precision-oriented limit.

9. The computer-implemented method of claim 2, wherein the computer device includes software provided as a service in a cloud computing environment.

10. A computer program product comprising one or more computer readable storage media having program instructions collectively stored on the one or more computer readable storage media, the program instructions executable to:
compare features extracted from a first document of a plurality of documents that include a sound, to features extracted from acoustic files related to the sound;
designate the sound in a document of the plurality of documents as a true positive in response to correctly identifying the sound;
designate the sound in the first document as a false negative in response to failing to identify the sound, and the sound existing in an acoustic library;
generate a first sound vector for the sound in the first document in response to the sound in the first document being designated a false negative;
generate a sound vector for each of the documents designated as a true positive;
create a centroid vector for the sound vectors of the documents designated as a true positive; and
redesignate the sound in the first document from a false negative to a true positive in response to the first sound vector and the centroid vector being a Banach space.

11. The computer program product of claim 10, wherein the program instructions are further executable to:
analyze a sound input including the sound;
perform sound recognition on the sound;
perform sound scene detection on the sound input to produce the plurality of documents, each of the plurality of documents being a portion of the sound input that includes the sound;
extract the features of the sound in the plurality of documents, the features of the sound being components of the sound that identify a linguistic content of the sound;
discover the acoustic files by searching the acoustic library;
perform sound scene detection on the acoustic files;
extract the features of the sound in the acoustic files; and
add the sounds designated as a true positive to an acoustic model of the sound.

12. The computer program product of claim 11, wherein the discovering further comprises discovering acoustic files that are related to at least one selected from the group consisting of: a hypernym of the sound, and a hyponym of the sound.

13. The computer program product of claim 12, wherein each of the documents is a different portion of the sound input.

14. The computer program product of claim 12, wherein the first sound vector includes the features of the sound in the first document.

15. The computer program product of claim 14, wherein the features of the sound in the first document include Mel Frequency Cepstral Coefficients and Delta coefficients.

16. The computer program product of claim 15, wherein the Banach space comprises a precision-oriented limit.

17. A system comprising:
a processor, a computer readable memory, and one or more computer readable storage media;
program instructions to compare features extracted from a first document of a plurality of documents that include a sound, to features extracted from acoustic files related to the sound;
program instructions to designate the sound in a document of the plurality of documents as a true positive in response to correctly identifying the sound;
program instructions to designate the sound in the first document as a false negative in response to failing to identify the sound, and the sound existing in an acoustic library;
program instructions to generate a first sound vector for the sound in the first document in response to the sound in the first document being designated a false negative;
program instructions to generate a sound vector for each of the documents designated as a true positive;
program instructions to create a centroid vector for the sound vectors of the documents designated as a true positive; and
program instructions to redesignate the sound in the first document from a false negative to a true positive in response to the first sound vector and the centroid vector being a Banach space,
wherein the program instructions are stored on the one or more computer readable storage media for execution by the processor via the computer readable memory.

18. The system of claim 17, further comprising:
program instructions to analyze a sound input including the sound;
program instructions to perform sound recognition on the sound;
program instructions to perform sound scene detection on the sound input to produce the plurality of documents, each of the plurality of documents being a portion of the sound input that includes the sound;
program instructions to extract the features of the sound in the plurality of documents, the features of the sound being components of the sound that identify a linguistic content of the sound;
program instructions to discover the acoustic files by searching the acoustic library;
program instructions to perform sound scene detection on the acoustic files;
program instructions to extract the features of the sound in the acoustic files; and
program instructions to add the sounds designated as a true positive to an acoustic model of the sound.

19. The system of claim 18, wherein the discovering further comprises discovering acoustic files that are related to a hypernym of the sound, and the discovering further comprises discovering acoustic files that are related to a hyponym of the sound.

20. The system of claim 19, wherein the Banach space comprises a precision-oriented limit.

* * * * *